United States Patent
Naito et al.

Patent Number: 5,493,342
Date of Patent: Feb. 20, 1996

[54] WHITE BALANCE CORRECTION CIRCUIT

[76] Inventors: Yasushi Naito, Hitachi-seshiria-nagatadai, 9-3, Nagatadai, Minami-ku, Yokohama-shi, Kanagawa-ken 232; Toshimitsu Watanabe, #520, Hitachi Fujimi-ryo, 1545, Yoshida-cho, Totsuka-ku, Yokohama-shi, Kanagawa-ken 244; Eiji Takagi, Hitachi-seshiria-nagatadai, 9-3, Nagatadai, Minami-ku, Yokohama-shi, Kanagawa-ken 232; Takeshi Mochizuki, #554, Hachiman-yama-apaato 5-tou, 1545, Yoshida-cho, Totsuka-ku, Yokohama-shi, Kanagawa-ken 244, all of Japan

[21] Appl. No.: 167,516

[22] Filed: Dec. 14, 1993

[30] Foreign Application Priority Data

Dec. 21, 1992 [JP] Japan ................................. 4-340491

[51] Int. Cl.⁶ .......................... H04N 9/73; H04N 5/202; H04N 9/69
[52] U.S. Cl. ............................................. 348/656; 348/674
[58] Field of Search .................................. 348/656, 655, 348/657, 674, 675; 358/29, 32, 164; H04N 9/73, 9/69, 5/202

[56] References Cited

U.S. PATENT DOCUMENTS 4,127,868 11/1978 Nagaoka et al. ..................... 348/674
5,068,718 11/1991 Iwabe et al. ......................... 348/675
5,296,920 3/1994 Sakaue et al. ....................... 348/675

FOREIGN PATENT DOCUMENTS

| 0479213A2 | 4/1992 | European Pat. Off. . | |
| 35593 | 4/1981 | Japan | 358/29 |
| 170187 | 10/1983 | Japan | 358/29 |
| 90591 | 5/1986 | Japan | H04N 9/12 |
| 185989 | 8/1991 | Japan | H04N 9/73 |
| 1108283 | 5/1965 | United Kingdom . | |

*Primary Examiner*—James J. Groody
*Assistant Examiner*—Chris Grant

[57] ABSTRACT

A white balance correction circuit, which receives a luminance signal (−Y) on the input terminal (20) and produces a modified luminance signal, has its gain G1 for the range of small input luminance signal level determined from the resistance ratio of resistors (29, 33), has its gain G2 for the range of medium input luminance signal level determined from the resistance ratio of the resistor 29 and resistors (33, 35) connected in parallel by a transistor (39) that has become conductive, and has its gain G3 for the range of large input luminance signal level determined from the resistance ratio of the resistor 29 and resistors (33, 34, 35) connected in parallel by the transistor (39) and a transistor (38) that has become conductive. Based on this modification, three picture projection tubes (23) have cathode voltage characteristics against the amplitude of luminance signal (−Y) represented by three polygonal lines that approximate the ideal luminance characteristics of the projection tubes.

4 Claims, 5 Drawing Sheets

WHITE BALANCE CORRECTION CIRCUIT

BACKGROUND OF THE INVENTION

The present invention relates to a color picture display apparatus based on the Braun tube, and particularly to a white balance correction circuit for accomplishing the reproduction of the white color (white balance) on the screen.

In displaying monochrome pictures on the screen of a color picture display apparatus, it is required to reproduce achromatic colors of a wide luminance range on the screen. This is achieved through the adjustment of the electrode voltage or electron gun drive voltage of the picture tube, and it is called "white balance correction". Unless the white balance correction is implemented properly, color pictures cannot be displayed in correct colors.

Among a variety of white balance correction circuits that are already known, an example described in Japanese Patent Publication No. 57-51796 will be explained with reference to FIG. 5.

In the figure, the circuit receives a luminance signal Y on its input terminal 101, and the signal is conducted through a transistor 102 and resistors 105, 109 and 113 in emitter-follower configuration and delivered to the emitter electrodes of transistors 104, 108 and 112. The circuit also receives color difference signals R-Y, G-Y and B-Y on its input terminals 103, 107 and 111, and these signals are delivered to the base electrodes of the transistors 104, 108 and 112. These three transistors function to subtract the luminance signal component from the respective color difference signals, and produce primary color signals R, G and B on their collector electrodes in connection with load resistors 106, 110 and 114. This circuit is generally called "output circuit".

The primary color signal B produced on the collector electrode of the transistor 112 is conducted through a circuit that is a parallel connection of a resistor 119 and a serially-connected resistor 121 and zener diode 120, and applied to the cathode electrode 124 of an electron gun for blue (B) of the color picture tube 125 so that the electron beam of blue is modulated by the signal. Similarly, the primary color signal G produced on the collector electrode of the transistor 108 and conducted through a circuit consisting of resistors 116 and 118 and a zener diode 117 is applied to the cathode electrode 123 of an electron gun for green (G) so that the electron beam of green is modulated by the signal. Another primary color signal R produced on the collector electrode of the transistor 104 and conducted through a resistor 115 is applied to the cathode electrode 112 of an electron gun for red (R) so that the electron beam of red is modulated by the signal. Each electron gun has its beam current intensity determined from the difference between the voltage of the cathode electrode and the voltage of the first grid electrode (not shown).

Assuming that all electron guns have their first grid maintained at zero volt, if the collector voltage of the transistor 104 associated with the red electron gun falls, the cathode voltage also falls, causing the red electron beam to increase. The beam current flows through the resistor 115, producing a voltage drop across it with a polarity opposite to the collector voltage of the transistor 104, thereby suppressing the beam current. Namely, the resistor 115 functions to provide a negative current feedback for the electron gun having nonlinear characteristics called "gamma" so that the linearity of operation is improved. Increasing the resistance of the resistor 115 increases the amount negative feedback, and thus more reduces the gamma and enhances the linearity of electron gun.

The zener diodes 117 and 120 have a certain threshold voltage (zener voltage) of operation, and each of these zener diodes turns on when the voltage across it reaches the zener voltage, or otherwise it turns off. When the beam currents of the green and blue electron guns are smaller, the voltage drops across the resistors 116 and 119 are lower than the zener voltage, causing the zener diodes 117 and 120 to be off. For the resistors 106, 110, 114, 115, 116 and 119 having resistances of R106, R110, R114, R115, R116 and R119, respectively, the red, green and blue electron guns operate in an equal condition of gamma and the white balance is satisfied if the condition R106+R115=R110 +R116=R114+R119 is met.

If the beam currents of the green and blue electron guns increase, causing the voltage drops across the resistors 116 and 119 to rise beyond the zener voltage, the zener diodes 117 and 120 turn on, resulting in a parallel connection of the resistors 116 and 118 in the cathode circuit of the green electron gun and a parallel connection of the resistors 119 and 121 in the cathode circuit of the blue electron gun. The resistors 121 and 118 have their resistances R121 and R118 selected to satisfy the following conditions:

$$(R114+R119//R121) < (R110+R116//R118) < (R106+R115)$$

where symbol "//" denotes the resistance of two resistors connected in parallel. Consequently, the blue electron gun has a large gamma, the red electron gun has a small gamma, and the green electron gun has a medium gamma between those of the red and blue electron guns.

Based on the foregoing circuit parameter setting, it is possible to have a large beam current for blue, a medium beam current for green and a small beam current for red for luminance signal levels above a certain threshold value, and it is possible to reproduce a picture on the screen of color picture tube such that the color temperature rises progressively for luminance signal levels above a certain level of the luminance signal, i.e., the accomplishment of white balance.

Development is under way for the enhancement of brightness and resolution of color pictures reproduced by display apparatus based on the Braun tube, particularly projection-type color picture display apparatus in which pictures reproduced by small independent Braun tubes for red, green and blue are projected by being magnified on to a screen.

The enhancement of brightness necessitates an increased electron beam current of the Braun tube and the enhancement of resolution necessitates a reduced spot diameter of the electron beam. However, both of these schemes increase the application power density on the fluorescent screen of the picture tube, promoting adversely the saturation of luminance of the fluorescent substance. The saturation of luminance of the fluorescent substance signifies that the light emission of fluorescent substance does not increase in response to an increased beam current in the large current region. This phenomenon of luminance saturation is more significant for the red fluorescent substance and particularly pronounced for the blue fluorescent substance relative to the green fluorescent substance.

There is known the following relationship between the electron gun drive voltage Ed and the anode current (beam current) Ep:

$$Ip = K_1 \cdot (Ed)^{\gamma_1} \text{ (where } K_1 \text{ is a constant)} \ldots \quad (2)$$

The parameter $\gamma_1$ is called the gamma characteristics of the electron gun.

There is another relationship between the luminance B (Br, Bg, Bb) of fluorescent substance (red, green, blue) and the electron gun anode current I (Ir, Ig, Ib) as follows.

$$Bm = K_2 \cdot (Ip)^{\gamma p} \text{ (where } K_2 \text{ is a constant, and m and p both represent subscripts r, g and b for red, green and blue)} \ldots \quad (3)$$

The parameter $\gamma_p$ is the gamma value of a fluorescent substance, e.g., the red fluorescent substance has $\gamma_r$.

The above formulas (2) and (3) are reduced to the following.

$$Bm = K_3 \cdot (Ed)^\gamma \text{(where } K_3 = K_1 \cdot K_2, \text{ and } \gamma = \gamma_1 \cdot \gamma_p) \ldots \quad (4)$$

The parameter $\gamma = \gamma_1 \cdot \gamma_p$ represents the gamma characteristics of luminance for a drive voltage Ed.

In case the electron gun has a gamma value $\gamma_1$ of about 2.5 for example, the green fluorescent substance has the best characteristics of $\gamma_g \cong 1.0$ among the luminance characteristics Br, Bg and Bb of red, green and blue, providing a substantially constant gamma characteristics of $\gamma_1 \cdot \gamma_g \cong 2.5$ throughout the luminance range. The red fluorescent substance has a constant gamma characteristics ($\gamma_1 \cdot \gamma_r \cong 2.5$) in a low luminance region, but it exhibits the saturation ($\gamma_1 \cdot \gamma_r \cong 1.8$) in a high luminance region. The blue fluorescent substance has $\gamma_1 \cdot \gamma b \cong 1.6$ in a low luminance region, but it exhibits the saturation ($\gamma_1 \cdot \gamma b \cong 2.3$) in a high luminance region. Due to the different gamma values γr, γg and γb of the fluorescent substances of red, green and blue, the white balance of the picture tube varies in response to the variation of luminance.

In the case of the ordinary color television receiver in which images of red, green and blue are formed on a single Braun tube, the light output is proportional to about the 2.2-th power of the signal voltage (luminance signal) applied to the grid of picture tube. Accordingly, it is possible to restore the linearity of this input/output relation through the modification of the signal voltage by means of a circuit that produces an output voltage in proportion to about the 0.45-th (½,2-th) power of the input signal voltage before it is applied to the picture tube. Actually, the NTSC-based color television signal has the rendition of the 0.45-th power of input voltage at the broadcasting station, and therefore each television receiver does not need to equip the above-mentioned modification circuit for the reproduction of satisfactory color pictures.

However, the projection-type display apparatus based on small independent Braun tubes for red, green and blue is required to produce a large light output, and the problem of the saturation of fluorescent substance, which is not a concern of the ordinary color television receiver, emerges. Namely, in dealing with the Problem of saturation of fluorescent substances of red and blue, a well-balanced color picture cannot be reproduced from the NTSC-based color television signal having the gamma modification of about 0.45-th power for all colors unless the red and blue signals are given gamma values large enough to compensate the saturation in contrast to the green signal that does not have the saturation problem.

Despite the above-mentioned technical situation attributable to the enhancement of the brightness of screen, the foregoing prior art can merely relax the gamma characteristics, but is incapable of attaining large gamma characteristics. In a conceivable case of the foregoing prior art applied to the drive circuits of red and green with the intention of setting the gamma characteristics to around 1.8, it is not possible to provide the inherent tone characteristics for the luminance signal and another problem of degraded picture quality will arise.

SUMMARY OF THE INVENTION

This invention is intended to overcome the foregoing prior art deficiency, and its prime object is to provide a white balance correction circuit capable of performing the accurate gamma modification for the enhancement of the brightness and resolution of the Braun tube and ensuring the tone characteristics of the luminance level while retaining the satisfactory white balance throughout the entire luminance range.

In order to achieve the above objective, the white balance correction circuit based on this invention is designed to control the drive voltage of the Braun tube through the rendition of gamma modification, which is opposite in direction to the conventional scheme, to the input luminance signal.

In a NTSC-based color television receiver, for example, the video/chrome signal processing circuit produces a luminance signal Y and color difference signals R–Y, G–Y and B–Y, and the matrix circuit adds the luminance signal to each color difference signal thereby to extract primary color signals R, G and B for driving the cathode electrodes of the Braun tube. The present invention is designed to implement the gamma modification, which is opposite in direction to the conventional scheme, for the luminance signal Y before it is delivered to the matrix circuit that drives the Braun tube. Specifically, the modification circuit has such operational characteristics that the luminance output Eo (projection tube drive signal) is produced for the luminance input signal Ei to the modification circuit in accordance with the gamma characteristics ($\gamma_p$) of each fluorescent substance as follows:

$$Eo = (Ei)^x, x = \gamma_0/(\gamma_1 \cdot \gamma_p) \ldots \quad (1)$$

where $\gamma_0 = 2.2$ for NTSC system, and $\gamma_1$ is the gamma value of the electron gun of the Braun tube. The gamma characteristics $\gamma_p$ varies in response to the amplitude of the luminance signal as mentioned above, and accordingly the value of X also varies in response to the amplitude of the luminance signal.

Since the input luminance signal Ei is already rendered the gamma modification based on the ½.2-th (i.e., $1/\gamma_0$) power, the total gamma characteristics from the magnitude of luminance signal without gamma modification to the intensity of light emission of fluorescent substance is (½.2)×(2.2/$_{(\gamma 1 \cdot \gamma p)}$)× $_{\gamma 1}$×$_{\gamma p}$=1 throughout the luminance range. Consequently, the luminance variation due to different gamma characteristics is eliminated and the satisfactory white balance is attained.

DESCRIPTION OF THE PREFERRED EMBODIMENT

An embodiment of this invention will be described with reference to the drawings.

Figure 1:
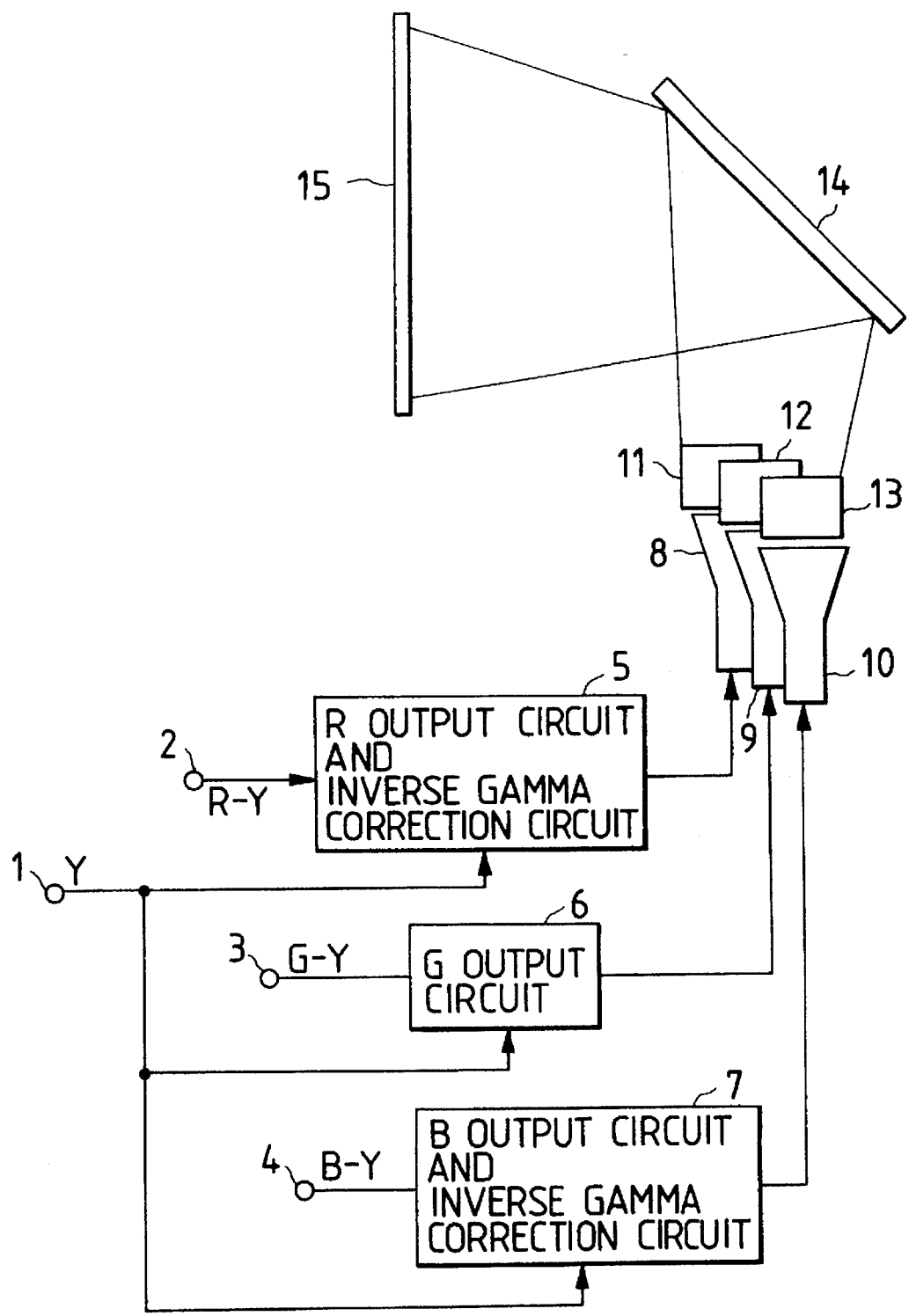
FIG. 1 is a block diagram of the white balance correction circuit based on an embodiment of this invention.

FIG. 1 is a block diagram of the white balance correction circuit of this invention applied to the projection-type television display apparatus. In the figure, reference numerals 1 through 4 denote input terminals, 5 is a red (R) output & inverse gamma modification circuit, 6 is a green (G) output circuit, 7 is a blue (B) output & inverse gamma modification circuit, 8, 9 and 10 are red, green and blue projection tubes, 11, 12 and 13 are projection lenses, 14 is a reflector, and 15 is a screen.

The red output & inverse gamma modification circuit 5, green output circuit 6 and blue output & inverse gamma modification circuit 7 are supplied with the color difference signals R–Y, G–Y and B–Y received on the input terminals 2, 3 and 4, respectively, and further supplied with the luminance signal Y received on the input terminal 1. These circuits 5, 6 and 7 adds the luminance signal to the respective color difference signals to produce primary color signals R, G and B, and the signals are delivered to the respective projection tubes 8, 9 and 10. By being driven by the primary color signals, the projection tubes 8, 9 and 10 have light emissions of red, green and blue with intensities determined by the signals.

The green output circuit 6 simply produces the primary color signal G from the color difference signal G–Y and luminance signal Y, while the red output & inverse gamma modification circuit 5 and blue output & inverse gamma modification circuit 7 modify the amplitude of their input luminance signal Y in the inverse gamma modification circuit section to produce γ-modified luminance signals and thereafter sum the resulting luminance signals and respective color difference signals to produce the primary color signals R and B.

The light beams of red, green and blue images emitted by the projection tubes 8–10 are expanded by the respective projection lenses 11–13, reflected by the reflector 14, and projected on to the screen 15 so that three primary color images are composed into a magnified color picture.

Figure 4:
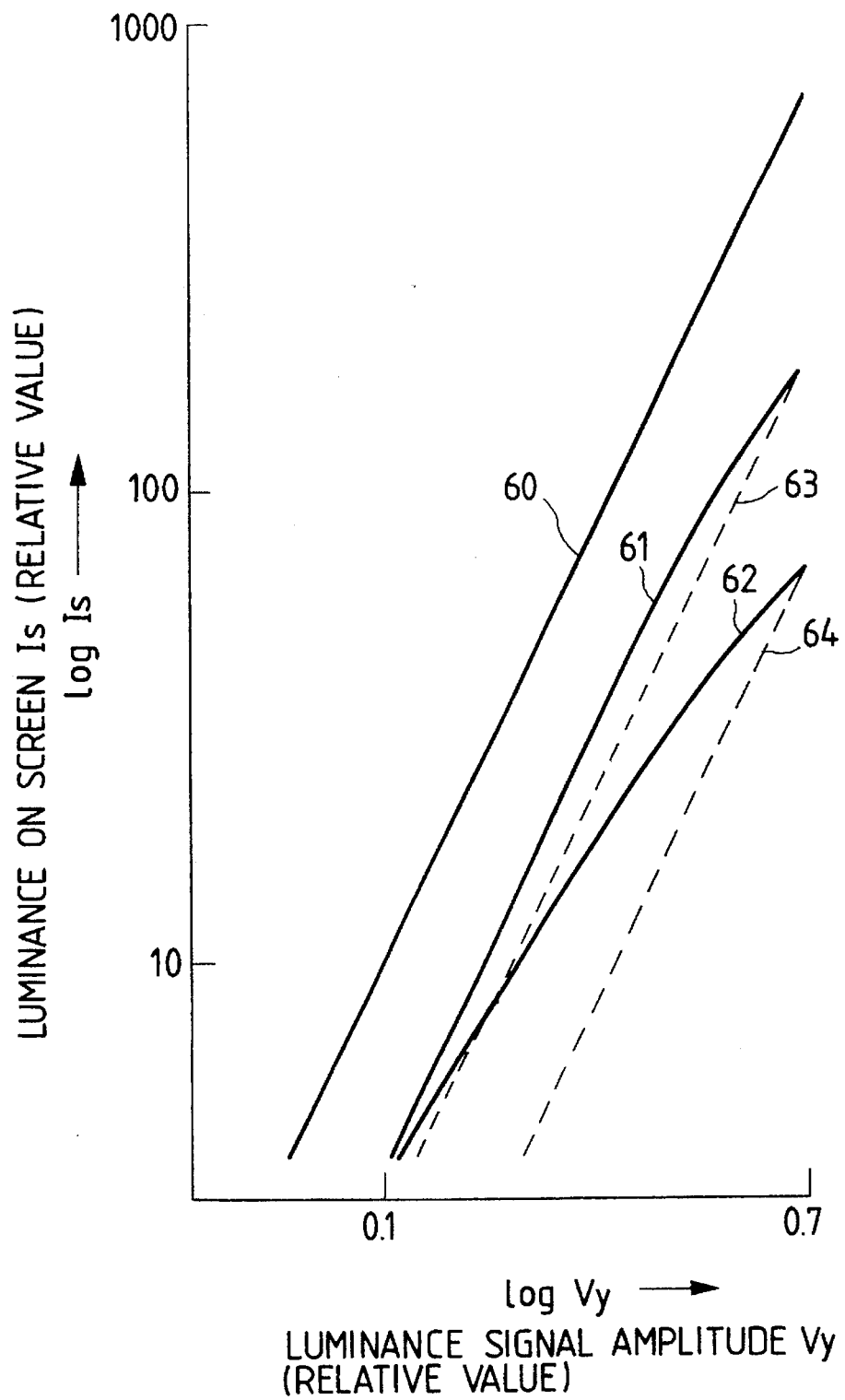
FIG. 4 is a characteristic graph showing the output luminance level of the projection tube for the input luminance signal.
Figure 5:
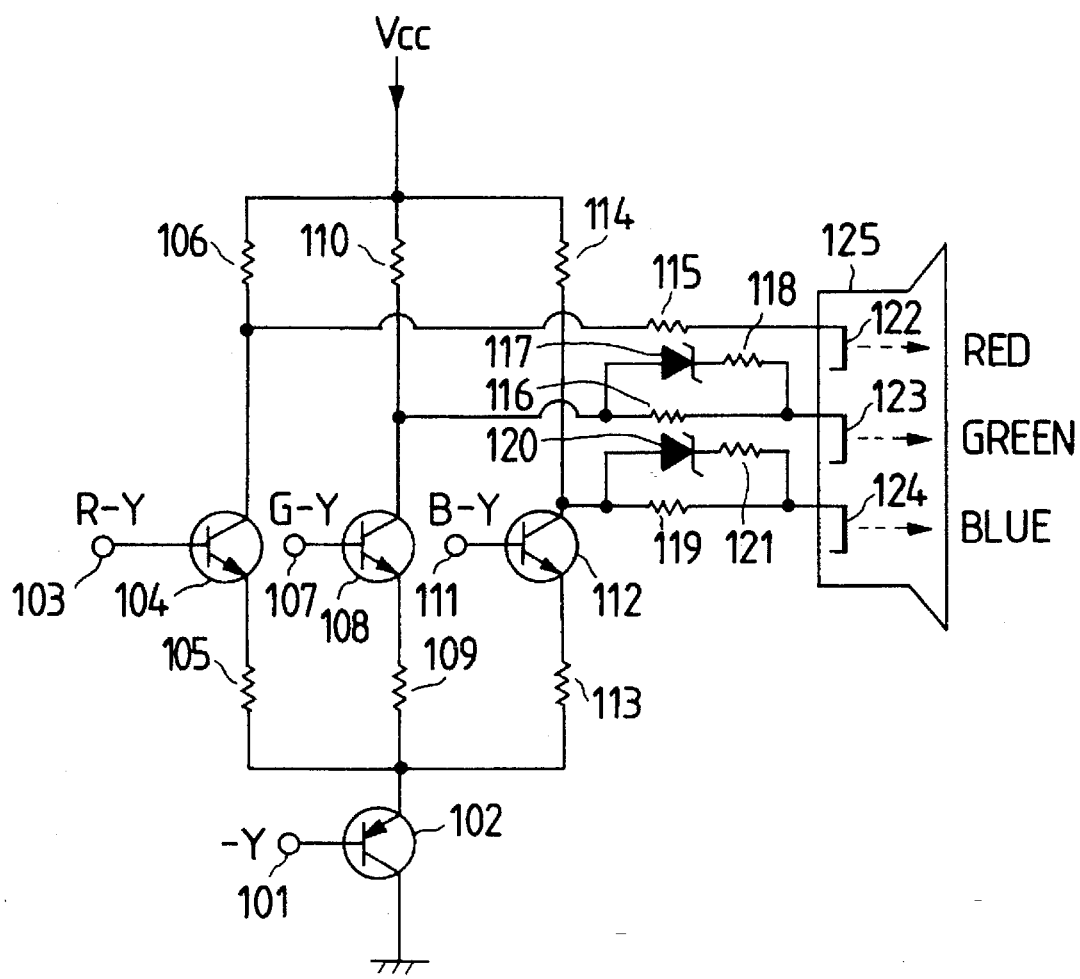
FIG. 5 is a schematic diagram showing a specific circuit arrangement of the conventional white balance correction circuit.

FIG. 4 shows an example of the Is characteristics of each primary color, in which the luminance on the screen 15 is plotted on the vertical axis of logarithmic scale against the amplitude Vy of the luminance signal Y on the input terminal 1. Indicated by 60 is the luminance characteristics of green, 61 and 62 are those of red and blue based on the conventional circuit without the inverse gamma modification for the luminance signal Y, and 63 and 64 are those of red and blue based on the circuit arrangement of this embodiment of invention with the inverse gamma modification applied to the luminance signal Y.

For the NTSC-based input luminance signal Y, it is desirable for the achievement of white balance to have an equal gradient of about 2.2 of the characteristic curves 60-62, as expressed in the following.

$$Is \propto (Vy)^{2.2} \ldots \quad (5)$$

Actually, however, the luminance characteristic curves 61 and 62 of red and blue have smaller gradients as compared with the curve 60 of green due to different characteristics of the fluorescent substances and electron guns used in the projection tubes 8–10 as described previously.

This embodiment is designed to cope with this matter through the provision of the output & inverse gamma modification circuits 5 and 7 for red and blue as shown in FIG. 1, by which the amplitude Vy of luminance signal Y is rendered the inverse gamma modification in producing the primary color signals R and B so that their characteristic curves 61 and 62 are modified to 63 and 64 having the equal gradient of the characteristic curve 60 of green. Consequently the white balance becomes invariable against the luminance variation.

For the electron gun of projection tube 8 or 10 having a gamma characteristics $\gamma_1$, the fluorescent substance of projection tube 8 or 10 having a gamma characteristics $\gamma_p$ and the input luminance signal Y having a gamma characteristics $1/\gamma_O$ (½.2=0.45 for NTSC system), the output & inverse gamma modification circuits 5 and 7 of red and blue are set to have gamma modification characteristics in terms of the output luminance signal Eo (projection tube drive signal) for the input luminance signal Ei as follows.

$$Eo=(Ei)^x, \quad X=\gamma_O/(\gamma_1 \cdot \gamma_p) \ldots \quad (1)$$

where the gamma characteristics $\gamma_p$ varies in response to the amplitude of luminance signal.

In operation, the gamma characteristics $\gamma_p$ of the X value offsets the luminance-dependent variation of gamma characteristics $\gamma_p$ of the fluorescent substances of the projection tubes 8 and 10 and the gamma characteristics $\gamma_O$ of the X value offsets the gamma modification $1/\gamma_O$ of the input luminance signal, and consequently the luminance characteristics of the equal gradient for red, green and blue are attained as shown by the characteristic curves 63, 60 and 64 in FIG. 4.

A specific circuit arrangement of the red (blue) output & inverse gamma modification circuit 5 (7) shown in FIG. 1, with a projection tube 23 of red or blue that is indicated by 8 or 10 in FIG. 1 being included, will be explained with reference to FIG. 2. In the figure, indicated by 20 and 21 are input terminals, 22 is an output terminal, 24–27 are voltage sources, 28–35 are resistors, 36–39 are npn transistors, 40 is a pnp transistor, and 41 is a capacitor. The input terminal 21 is connected to the input terminal 2 (4) of FIG. 1 to receive the color difference signal R–Y (B–Y), and the input terminal 20 receives the luminance signal Y of the negative polarity (will be termed –Y).

Figure 3:
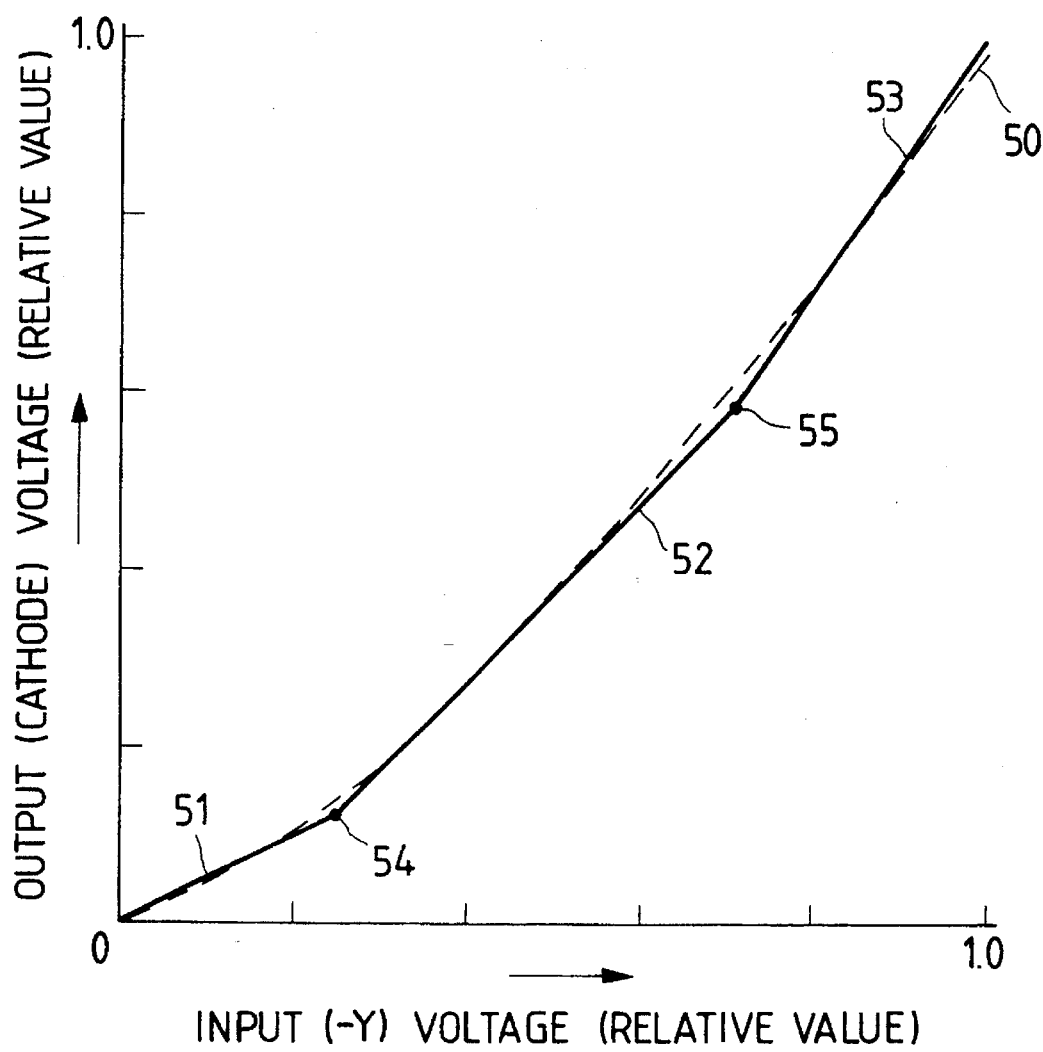
FIG. 3 is a characteristic graph showing a specific example of the input/output relation of the circuit shown in FIG. 2.

This circuit is designed to present the input/output characteristics shown in FIG. 3. The characteristic graph of FIG. 3 shows the voltage amplitude on the output terminal 22 against the luminance signal –Y (i.e., the cathode voltage amplitude characteristics of the projection tube 23). The characteristics resulting from this embodiment, which is represented by a polygonal line formed of line segments 51, 52 and 53 linked at points 54 and 55, is a close approximation to the ideal characteristic curve 50 shown by the dashed line.

Next, the operation of this circuit arrangement will be explained. In FIG. 2, the luminance signal –Y received on the input terminal 20 is applied to the base of the transistor 40. When the luminance signal –Y has a small amplitude enough to cut off the transistors 38 and 39 the circuit gain G1 is determined from the resistances R29 and R33 of the resistors 29 and 33 as:

$$G1=R29/R33.$$

Within the range of this small signal amplitude, the cathode voltage of the projection tube 23 is represented by the line segment 51 in FIG. 3.

As the amplitude of luminance signal –Y increases, causing the emitter voltage of transistor 40 to fall below the voltage set on the emitter of transistor 39, and the transistor 39 becomes conductive. In this case, when the luminance signal −Y has such a moderate amplitude that another transistor 38 does not yet become conductive, the circuit gain G2 is expressed by the parallel resistance of R33 and R35 and the resistance R35 of the resistor 35 as:

$$G2=\{(1/R33)+(1/R35)\}\times R29.$$

Within the range of this medium signal amplitude, the cathode voltage of the projection tube 23 is represented by the line segment 52 in FIG. 3. The joint 54 of line segments is the threshold of conduction of the transistor 39.

As the amplitude of luminance signal −Y further increases, the transistor 38 becomes conductive steadily, resulting in a parallel connection of the resistors 33, 34 and 35. The circuit gain G3 for such a large amplitude of luminance signal −Y is expressed by including the resistance R34 of the resistor 34 as:

$$G3=\{(1/R33)+(1/R34)+(1/R35)\}\times R29$$

In the range of the large signal amplitude, the cathode voltage of the projection tube 23 is represented by the line segment 53 in FIG. 3. The joint 55 of line segments is the threshold of conduction of the transistor 38.

Based on this circuit operation, the modification characteristics approximated to the ideal characteristics 50 shown in FIG. 3 is obtained.

Figure 2:
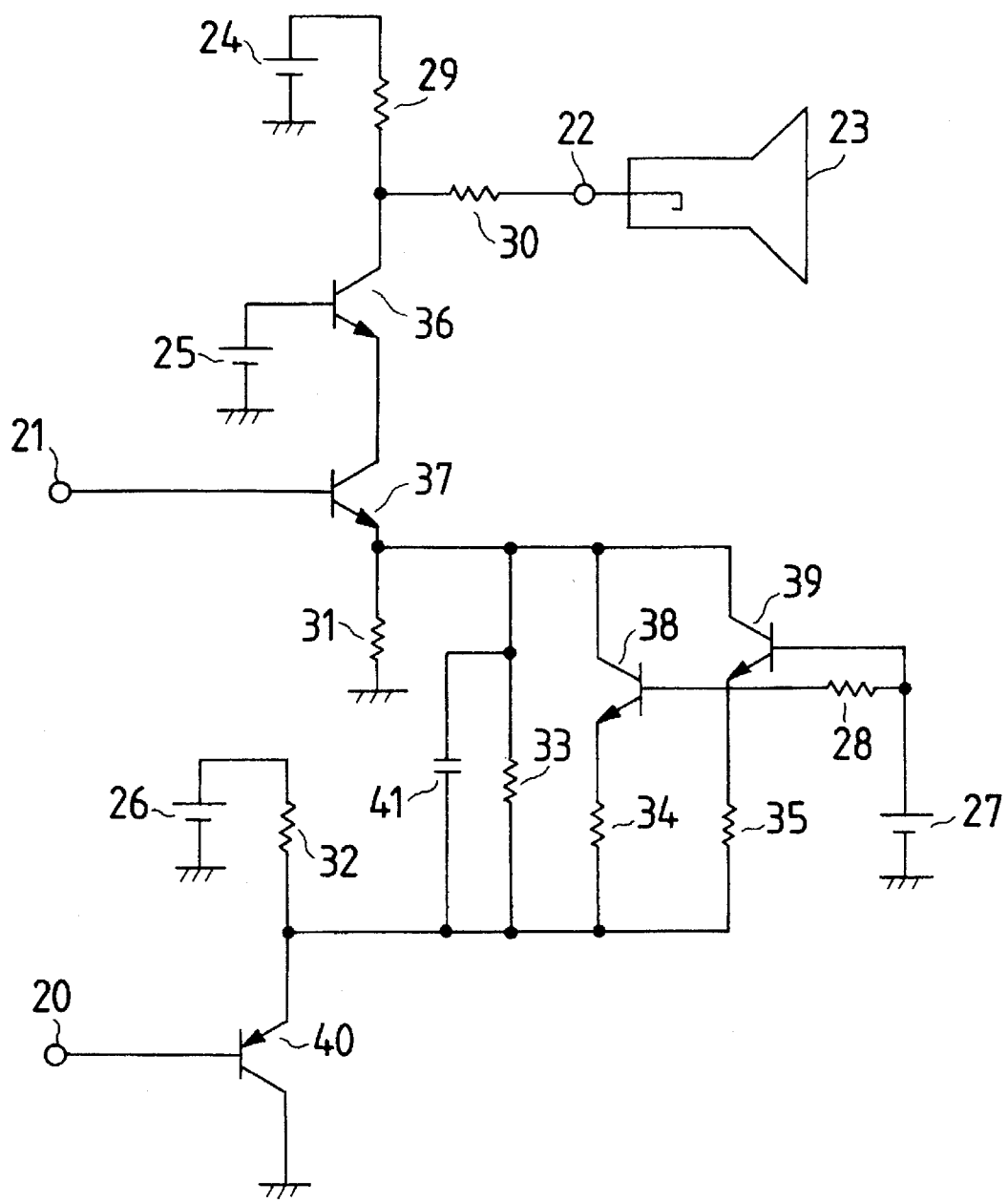
FIG. 2 is a schematic diagram showing a specific circuit arrangement of the output & inverse gamma modification circuit shown in FIG. 1.

Although in this embodiment the modification curve 60 is approximated with the polygonal line of three line segments 51, 52 and 53 and this is sufficient to attain the luminance characteristics 63 and 64 shown in FIG. 4, it is of course possible to approximate the ideal modification characteristics based on a polygonal line formed of four or more line segments by adding transistor-resistor circuits in parallel to the resistor 33 in FIG. 2. The modification of luminance characteristics can be applied not only to the red and blue projection tubes 8 and 10, but also to all of red, green and blue projection tubes 8, 9 and 10 when necessary.

Although this embodiment is an application of this invention to the display apparatus based on the luminance signal and color difference signals typified by television receivers, the inverse gamma modification circuit of this embodiment can be applied to the primary color signals of computer display apparatus that effects the signal processing solely based on the primary color signals and the same effectiveness of modification as this embodiment can be achieved.

According to this invention as described above, the luminance characteristics of three primary colors, i.e., red, green and blue, can be equalized through the modification of gamma characteristics even if the light outputs of red and blue are lower due to the saturation of fluorescent substances than that of green, and the white balance can be maintained constant in the entire luminance range.

An additional advantage of this invention is the improved contrast of displayed pictures resulting from the lower circuit gain in the region of small input luminance signal, as shown in FIG. 3, which suppresses the light output of blue.

In contrast to the conventional time-consuming white balance adjustment scheme in which the low, medium and high luminance points are balanced through the reference to a grey scale or the like and the adjustment for the low and high luminance points must be repeated, the inventive scheme is capable of attaining the white balance of a medium luminance level through the adjustment for a low and high luminance points, whereby the time expended for the white balance adjustment can be reduced.

What is claimed is:

1. A white balance correction circuit for accomplishing the white balance of a display screen, said circuit comprising first means of producing a primary color signal R from a luminance signal Y and a color difference signal R−Y, second means of producing a primary color signal G from the luminance signal Y and a color difference signal G−Y and third means of producing a primary color signal B from the luminance signal Y and a color difference signal B−Y, said primary color signals R, G and B being used to control the intensity of electron beams emitted by electron guns of Braun tubes for the red (R), green (G) and blue (B) colors, respectively, wherein at least one of said first, second and third means includes a gamma characteristics modification means having modification characteristics in terms of the output luminance signal Eo (projection tube drive signal) thereof for the input luminance signal Ei thereof expressed as:

$$Eo=(Ei)^x, X=\gamma_O/(\gamma_1 \cdot \gamma_p)$$

where $1/\gamma_O$ (including the case of $\gamma_O=1$) is the gamma characteristics of the input luminance signal, $\gamma_1$ is the gamma characteristics of the electron gun of the Braun tube, and $\gamma_p$ is the gamma characteristics of the light emitting substance of the Braun tube.

2. A white balance correction circuit according to claim 1, wherein said modification means is included in said third means.

3. A white balance correction circuit according to claim 1 or 2, wherein said modification characteristics is approximated with a polygonal line formed of a plurality of linear line segments.

4. A white balance correction circuit according to claim 3, wherein said modification means comprises:

a grounded-emitter amplifying circuit having a first transistor which is supplied with the input luminance signal Y and a first resistor; and a plurality of circuits each formed of a resistor and a switching element connected in series, said circuits being connected in parallel to each other and also connected in parallel to said first resistor of said amplifying circuit, said switching elements of said serial resistor-switch circuits becoming conductive one after another as the amplitude of the input luminance signal increases progressively so that the circuit gain varies.

* * * * *